(12) United States Patent
Westgarth et al.

(10) Patent No.: US 10,954,703 B2
(45) Date of Patent: Mar. 23, 2021

(54) MOTOR VEHICLE HAVING DOOR CHECK MECHANISM

(71) Applicant: Ford Global Technologies, LLC, Dearborn, MI (US)

(72) Inventors: Brian Westgarth, Billericay (GB); Ian Patterson, Billericay (GB); Rob Swann, Rayleigh (GB); Jack Whitehurst, Leigh On Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/564,113

(22) Filed: Sep. 9, 2019

(65) Prior Publication Data
US 2020/0080353 A1 Mar. 12, 2020

(30) Foreign Application Priority Data
Sep. 12, 2018 (GB) ..................................... 1814805

(51) Int. Cl.
*E05C 17/22* (2006.01)
*E05C 17/12* (2006.01)
*B60J 5/04* (2006.01)

(52) U.S. Cl.
CPC ............... *E05C 17/12* (2013.01); *B60J 5/047* (2013.01)

(58) Field of Classification Search
CPC ... Y10T 16/61; Y10T 16/629; Y10T 16/6295; Y10T 292/285; Y10T 292/286; Y10T 292/304; E05C 17/025; E05C 17/04; E05C 17/12; E05C 17/20; E05C 17/203; E05C 17/206; E05C 17/22; E05C 17/26; E05C 17/24; E05C 17/28; E05C 17/18; E05F 5/025; E05F 5/08; F05F 5/06; F05F 5/08; F05F 5/12; E05Y 2900/531; E05Y 2201/224; E05Y 2201/248; E05Y 2201/25; E05Y 2201/696; E05Y 2201/702; B60J 5/047
See application file for complete search history.

(56) References Cited

U.S. PATENT DOCUMENTS 1,028,850 A * 6/1912 Aspegrén .............. E05C 17/203
 16/82
5,173,991 A * 12/1992 Carswell .............. E05C 17/203
 16/86 A
(Continued)

FOREIGN PATENT DOCUMENTS

DE 102008044965 A1 * 3/2009 ......... E05D 11/1057
DE 102009056985 A1 * 6/2011 ................ E05F 3/16
(Continued)

OTHER PUBLICATIONS

Extended European Search Report for European Application No. 19195131.8 completed on Jan. 30, 2020.

*Primary Examiner* — Chuck Y Mah
(74) *Attorney, Agent, or Firm* — David Coppiellie; Carlson, Gaskey & Olds, P.C

(57) ABSTRACT

This disclosure relates to a motor vehicle having a door check mechanism. An example motor vehicle includes a door pivotable between fully open and fully closed positions, and a door check mechanism including a bar having a helical groove and at least one check hold recess along the helical groove.

13 Claims, 7 Drawing Sheets

(56) References Cited

U.S. PATENT DOCUMENTS

| | | | | |
|---|---|---|---|---|
| 5,341,598 | A | * | 8/1994 | Reddy .................... B61D 19/02 49/362 |
| 5,727,287 | A | * | 3/1998 | Hosken ................. E05C 17/203 16/334 |
| 5,862,570 | A | * | 1/1999 | Lezuch ................. E05C 17/085 16/82 |
| 6,073,308 | A | | 6/2000 | Linnenbrink et al. |
| 7,240,399 | B2 | * | 7/2007 | Murayama ............ E05C 17/203 16/82 |
| 7,992,460 | B2 | * | 8/2011 | Bochen .................. F16H 25/24 74/424.76 |
| 8,136,204 | B2 | | 3/2012 | Ohno et al. |
| 8,414,062 | B2 | * | 4/2013 | Gobart ................ E05D 11/1028 296/146.4 |
| 9,556,658 | B2 | * | 1/2017 | Jung ................... E05D 11/1071 |
| 2008/0172945 | A1 | * | 7/2008 | Hoffman .................. E05F 5/08 49/386 |
| 2009/0300880 | A1 | | 12/2009 | Ohno et al. |
| 2013/0031747 | A1 | | 2/2013 | Gobart et al. |

FOREIGN PATENT DOCUMENTS

| | | | |
|---|---|---|---|
| DE | 102011056225 | A1 | 6/2013 |
| JP | S572960 | U † | 8/1982 |
| JP | 2016125205 | A | 7/2016 |
| KR | 1020160062997 | A * | 6/2016 |
| KR | 180008332 | B1 * | 12/2017 |
| WO | 9954583 | A2 | 10/1999 |
| WO | 2007012729 | A1 | 2/2007 |
| WO | WO/2019/108151 | A2 † | 6/2019 |

\* cited by examiner
† cited by third party

MOTOR VEHICLE HAVING DOOR CHECK MECHANISM

RELATED APPLICATION(S)

This application claims priority to GB Patent Application No. GB 1814805.6, filed on Sep. 12, 2018, the entirety of which is herein incorporated by reference.

TECHNICAL FIELD

This disclosure relates to a motor vehicle having a door check mechanism.

BACKGROUND

Motor vehicle doors are known to include door check mechanisms having a linear door check bar for limiting the opening motion of a vehicle door that provides a number of intermediate stay positions.

SUMMARY

A motor vehicle according to an exemplary aspect of the present disclosure includes, among other things, a door pivotable between fully open and fully closed positions, and a door check mechanism including a bar having a helical groove and at least one check hold recess along the helical groove.

In a further non-limiting embodiment of the foregoing motor vehicle, the door check mechanism includes at least one detent configured to contact the helical groove.

In a further non-limiting embodiment of any of the foregoing motor vehicles, the detent is biased toward the helical groove by a spring.

In a further non-limiting embodiment of any of the foregoing motor vehicles, the door check mechanism includes a rotary holding member supporting the spring and the at least one detent.

In a further non-limiting embodiment of any of the foregoing motor vehicles, the door check mechanism includes a support housing with a bore within which the rotary holding member is received, and the rotary holding member is configured to rotate within the bore.

In a further non-limiting embodiment of any of the foregoing motor vehicles, the at least one detent is configured to be received in the at least one check hold recess.

In a further non-limiting embodiment of any of the foregoing motor vehicles, when the at least one detent is received in the at least one check hold recess, additional force is required to pivot the door than when the detent is not received in the at least one check hold recess.

In a further non-limiting embodiment of any of the foregoing motor vehicles, the bar includes first and second helical grooves circumferentially spaced-apart from one another by about 180 degrees.

In a further non-limiting embodiment of any of the foregoing motor vehicles, the door check mechanism is configured to hold the door in the fully open position, a half open position, and an intermediate position between the half open position and the fully closed position, the first and second helical grooves each include a check hold recess configured to receive detents when the door is in the fully open position and the half open position, and only the first helical groove includes a check hold recess configured to receive a detent when the door is in the intermediate position.

In a further non-limiting embodiment of any of the foregoing motor vehicles, the bar includes first, second, and third helical grooves circumferentially spaced-apart from one another by about 120 degrees.

In a further non-limiting embodiment of any of the foregoing motor vehicles, the door check mechanism is configured to hold the door in the fully open position, a half open position, and an intermediate position between the half open position and the fully closed position, the first, second, and third helical grooves each include a check hold recess configured to receive detents when the door is in the fully open position, only the first and second helical grooves include a check hold recess configured to receive detents when the door is in the half open position, only the first helical groove includes a check hold recess configured to receive a detent when the door is in the intermediate position.

In a further non-limiting embodiment of any of the foregoing motor vehicles, the helical groove extends around the bar at a constant angle.

In a further non-limiting embodiment of any of the foregoing motor vehicles, the helical groove extends around the bar at an angle which varies along the length of the bar.

In a further non-limiting embodiment of any of the foregoing motor vehicles, the helical groove extends around the bar at an angle which increases along the length of the bar such that the door check mechanism increasingly resists movement of the door to the fully open position.

A door check mechanism according to an exemplary aspect of the present disclosure includes, among other things, a bar including a helical groove.

In a further non-limiting embodiment of the foregoing door check mechanism, at least one detent configured to biased into contact with the helical groove by a spring.

In a further non-limiting embodiment of any of the foregoing door check mechanisms, the door check mechanism includes a rotary holding member supporting the spring and the at least one detent, the door check mechanism includes a support housing with a bore within which the rotary holding member is received, and the rotary holding member is configured to rotate within the bore.

In a further non-limiting embodiment of any of the foregoing door check mechanisms, the bar includes at least one check hold recess along the helical groove, the at least one detent is configured to be received in the at least one check hold recess, and when the detent is received in the at least one check hold recess, additional force is required to pivot a door than when the detent is not received in the at least one check hold recess.

In a further non-limiting embodiment of any of the foregoing door check mechanisms, the helical groove extends around the bar at an angle which increases along the length of the bar such that the door check mechanism increasingly resists movement of a door to a fully open position.

BRIEF DESCRIPTION OF THE DRAWINGS

FIG. 4d is a side view on an enlarged scale of part of the check arm shown in FIGS. 3 and 4a.

DETAILED DESCRIPTION

Figure 1:
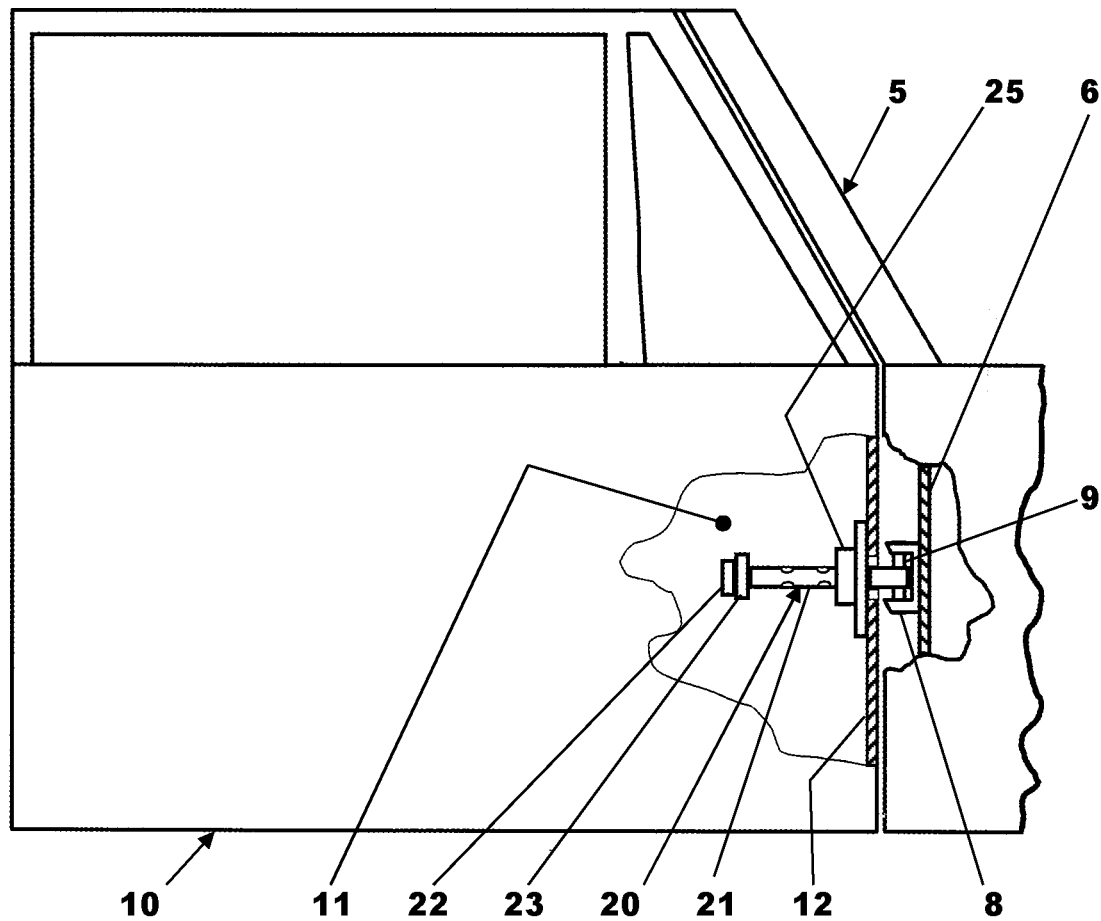
FIG. 1 is a partially cutaway side view of a motor vehicle door having a prior art door check mechanism showing the door in a closed position.

This disclosure relates to a motor vehicle having a door check mechanism. An example motor vehicle includes a door pivotable between fully open and fully closed positions, and a door check mechanism including a bar having a helical groove and at least one check hold recess along the helical groove. The disclosed door check mechanism provides a greater number of door check positions and minimizes the change of unintended contact between the door and an adjacent object. These and other benefits will be appreciated from the below description.

The term "door check mechanism" is not a generic placeholder for means or a nonce term, but is instead a known term in this art referring to a structure and/or structures configured to stop and hold an open vehicle door at one or more specified open positions. Door check mechanisms are sometimes referred to as door check assemblies or simply door checks.

A first aspect of this disclosure relates to a motor vehicle having a door pivotally mounted to part of a body structure of the motor vehicle for movement between fully open and fully closed positions, and a rotary door check mechanism to control opening and closing of the door. The rotary door check mechanism includes a door check bar connected at a first end to one of part of the body structure of the motor vehicle and a structural part of the door. The door check bar has an end stop at a distal second end of the door check bar to where it is connected at the first end, a support housing fastened to the other of the part of the body structure of the motor vehicle and the structural part of the door of the motor vehicle, and a door holding mechanism having a rotary body member rotatably supported by the support housing through which the door check bar extends. The rotary body member supports at least one spring loaded detent, which is engaged with a respective helical guide extending along the door check bar so as to provide a driving connection between the door check bar and the rotary body member to produce rotary motion of the rotary body member when there is relative movement between the rotary body member and the door check bar. Each helical guide includes two or more check stops engageable by the cooperating spring loaded detent defining door check positions. Friction in the rotary door check mechanism prevents unchecked movement of the door while it is not in a latched shut position.

Further, engagement between a spring loaded detent and a check stop may increase the force required to move the door in either direction from that position.

Additionally, each helical guide may include one check stop positioned on the door check bar corresponding to a door fully open position.

The door check bar may also have a longitudinal axis and each helical guide may be arranged at a uniform helix angle with respect to the longitudinal axis of the door check bar. Alternatively, the door check bar may have a longitudinal axis and each helical guide may be arranged at a helix angle with respect to the longitudinal axis and the helix angle of each helical guide may increase along the door check bar from the first end towards the second end. As yet another alternative, the door check bar may have a longitudinal axis and each helical guide may be arranged at a helix angle with respect to the longitudinal axis and the helix angle of each helical guide may increase near to the second end of the door check bar.

The door check bar may also be attached at the first end to part of the body structure of the motor vehicle and the support housing may be fastened to the structural part of the door of the motor vehicle.

Each helical guide may be a helical groove formed in the door check bar.

There may be two helical grooves and two spring loaded detents, one of the two spring loaded detents may be engaged with one of the helical grooves and the other spring loaded detent may be engaged with the other helical groove and the check stops may be formed by check hold recesses formed in the helical grooves.

Both helical grooves may include one check stop positioned on the door check bar corresponding to a door fully open position. Alternatively, there may be three helical grooves and three spring loaded detents, a respective one of the three spring loaded detents being engaged with each of the helical grooves and the check stops are formed by check hold recesses formed in the helical grooves.

All of the helical grooves may include one check stop positioned on the door check bar corresponding to a door fully open position. At least two of the helical grooves may include one check stop positioned on the door check bar corresponding to a door half open position. At least one of the helical grooves may include one check stop positioned on the door check bar corresponding to a door position between shut and half open.

Another aspect of this disclosure relates to a rotary door check mechanism for use in a motor vehicle comprising a door check bar connected in use at a first end to part of a body structure of the motor vehicle and having an end stop at a distal second end of the door check bar to the first end. Further, a support housing is fastened in use to a structural part of a door of the motor vehicle and a door holding mechanism having a rotary body member rotatably supported by the support housing through which the door check bar extends. The rotary body member supports at least one spring loaded detent, which is engaged with a respective helical groove extending along the door check bar so as to provide a driving connection between the door check bar and the rotary body member to produce rotary motion of the rotary body member when there is relative movement between the rotary body member and the door check bar. Each helical groove includes two or more check stops engageable by a respective cooperating spring loaded detent to define door check positions.

There may be two helical grooves and two spring loaded detents, one of the two spring loaded detents may be engaged with one of the helical grooves and the other spring loaded detent may be engaged with the other helical groove and the check stops may be formed by check hold recesses formed in the helical grooves.

There may be three helical grooves and three spring loaded detents, a respective one of the three spring loaded detents may be engaged with each of the helical grooves and the check stops may be formed by check hold recesses formed in the three helical grooves.

It will be appreciated that the figures are provided for illustrative purposes only and are not intended to represent fully engineered components.

Figure 2:
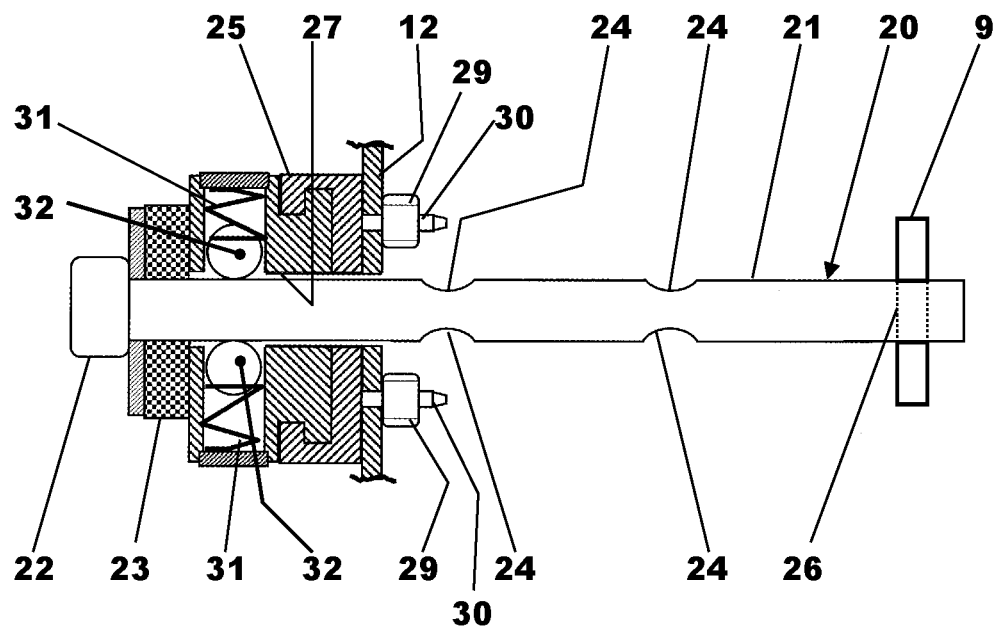
FIG. 2 is an enlarged cross-sectional view of the prior art door check mechanism shown in FIG. 1 showing the arrangement of the door check mechanism when the door is fully open.

FIGS. 1 and 2 illustrate a prior art motor vehicle 5 having a door 10 pivotally mounted to part of a body structure 6 of the motor vehicle 5 for movement between fully open and fully closed positions and a vehicle door check mechanism 20 to prevent movement of the door 10 in an opening direction beyond a predefined limit referred to as a 'fully open position'.

The door 10 has a door structure defining a cavity 11 in which the vehicle door check mechanism 20 is mounted to a structural part 12 of the door 10 defining a front end of the door cavity 11.

The vehicle door check mechanism 20 comprises a door holder bar 21 having an end stop 22 at one end thereof and being adapted at an opposite end for attachment to part of a body structure of a motor vehicle by means of a transverse aperture 26 formed in the door holder bar 21 for accommodating a mounting pin 9. The mounting pin 9 is engaged with a bracket 8 fastened to part of the body structure 6 of the motor vehicle 5.

The support housing 25 has a passage 27 through which the door holder bar 21 extends.

The door holder bar 21 is, in the case of this example, rectangular in cross-section and has four spaced apart recesses 24 for cooperation with a door holding mechanism disposed in the support housing 25 so as to provide intermediate holding positions for the door 10 between the fully open and fully closed positions.

The door holding mechanism comprises a pair of locking members in the form of balls 32 each being biased by a respective spring 31 towards the door holder bar 21 so as to engage with the one of the recesses 24 in the door holder bar 21 when the door 10 is in a predefined partially open position.

The end stop 22 comprises an enlarged portion of the door holder bar 21 and a resilient pad 23 having a support plate that abuts against the end stop 22.

When the door 10 reaches a position approaching the fully open position the resilient pad 23 contacts the support housing 25 and is compressed by the movement of the end stop 22 towards the support housing 25.

When the door 10 is opened quickly the kinetic energy of the opening door 10 must be arrested solely by compression of the resilient pad 23 as the door reaches the fully open position as the movement of the support housing 25 along the door holder bar 21 is almost frictionless. This will result in a large force being transferred via the support housing 25 to the door structure 12 to which the support housing 25 is secured via a threaded connection in the form of nuts 29 and threaded studs 30. In addition there are limited opportunities for recesses along the length of the door holder bar 21.

Figure 3:
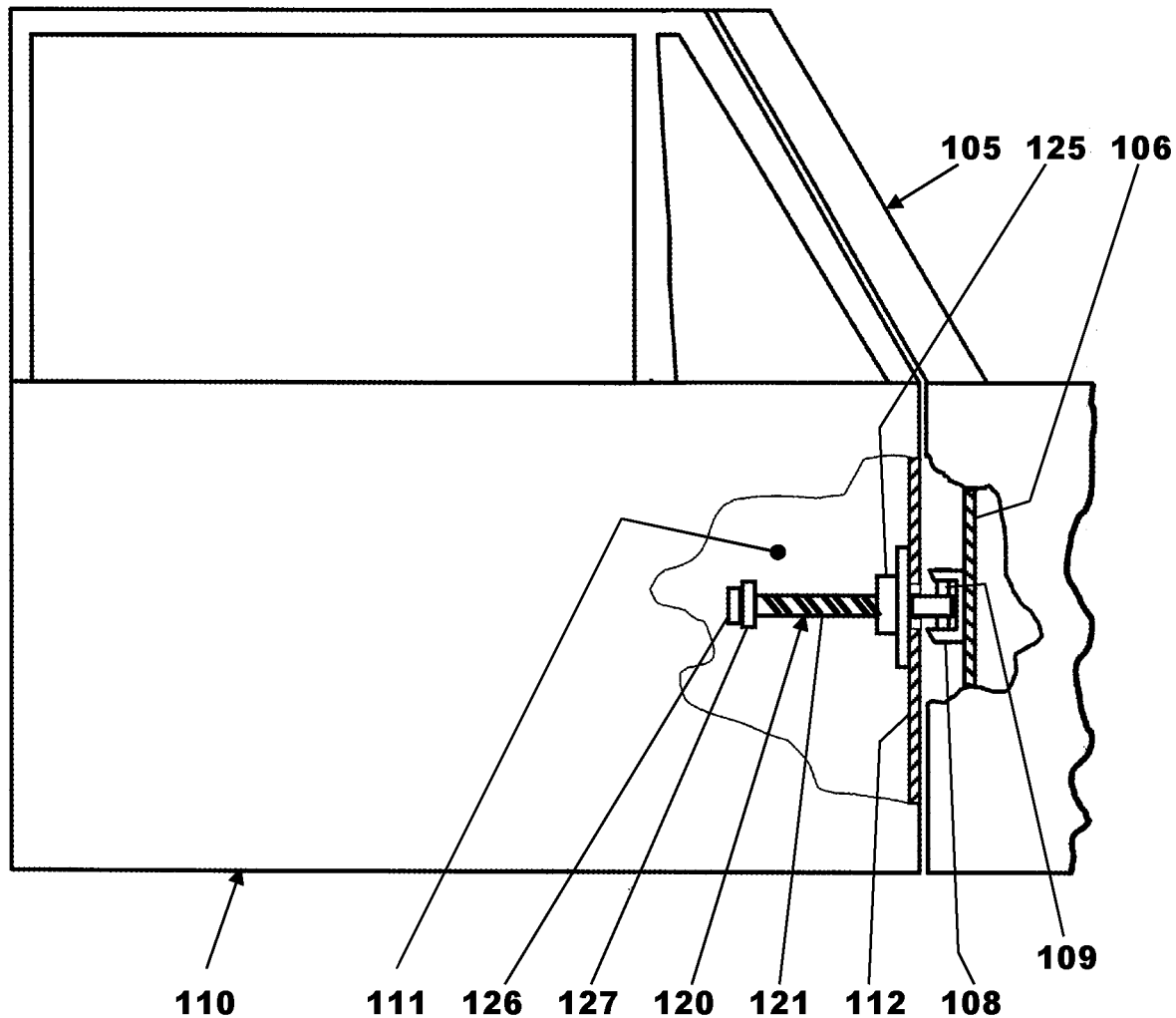
FIG. 3 is a partially cutaway side view of a motor vehicle door having a rotary door check mechanism in accordance with a first embodiment of this disclosure showing the door in a closed position.
Figure 4A:
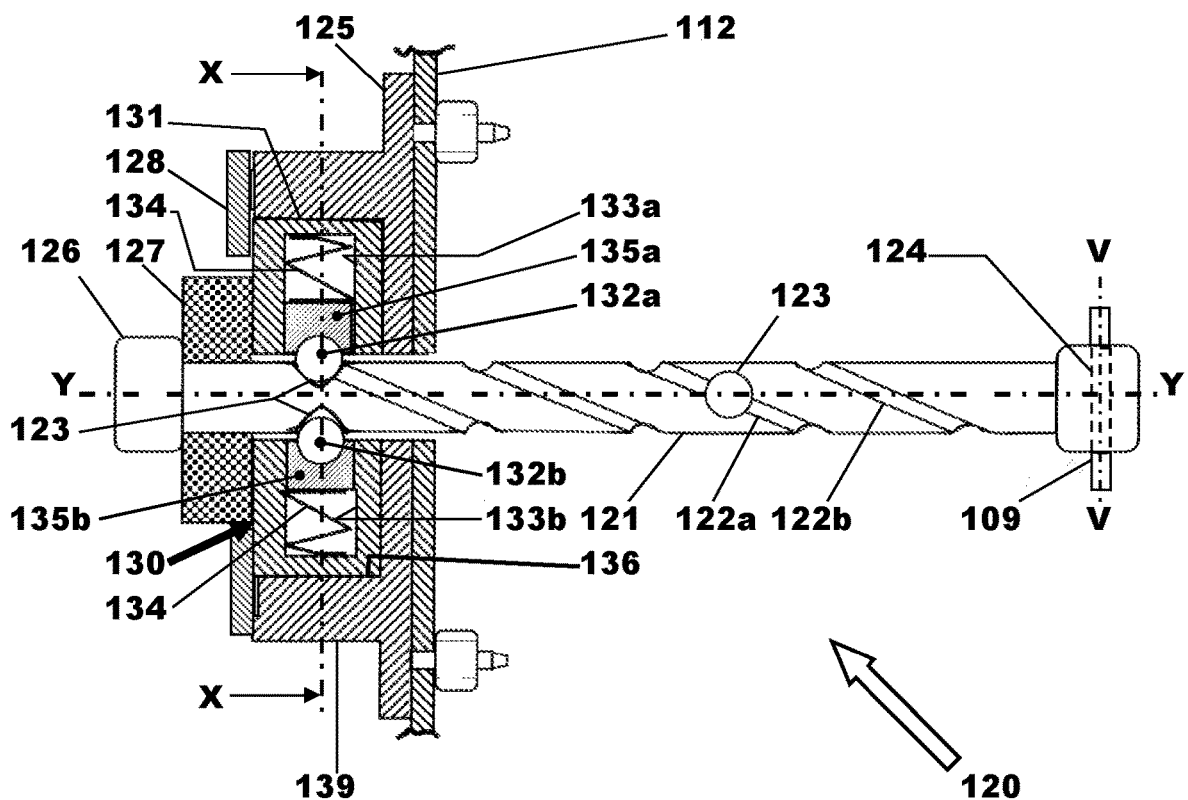
FIG. 4a is an enlarged part cross-sectional view of the rotary door check mechanism shown in FIG. 3 showing the arrangement of the door check mechanism when the door is in a fully open position.
Figure 4B:
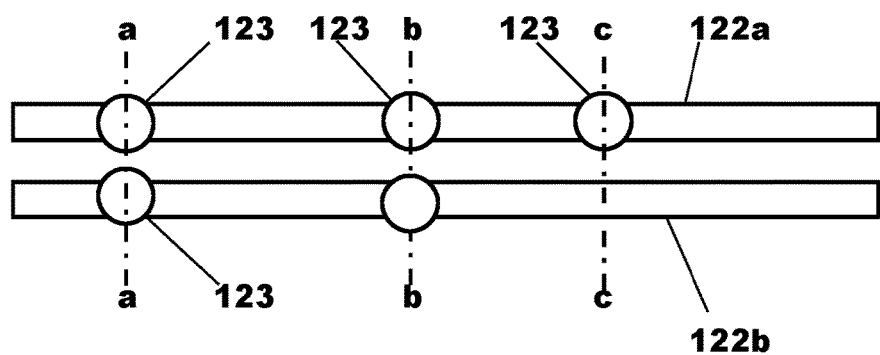
FIG. 4b is a diagram showing the two helical grooves formed in the check arm of FIG. 4a with the helical grooves laid out in a linear form and showing the positioning of check hold recesses formed in each of the helical grooves.
Figure 4C:
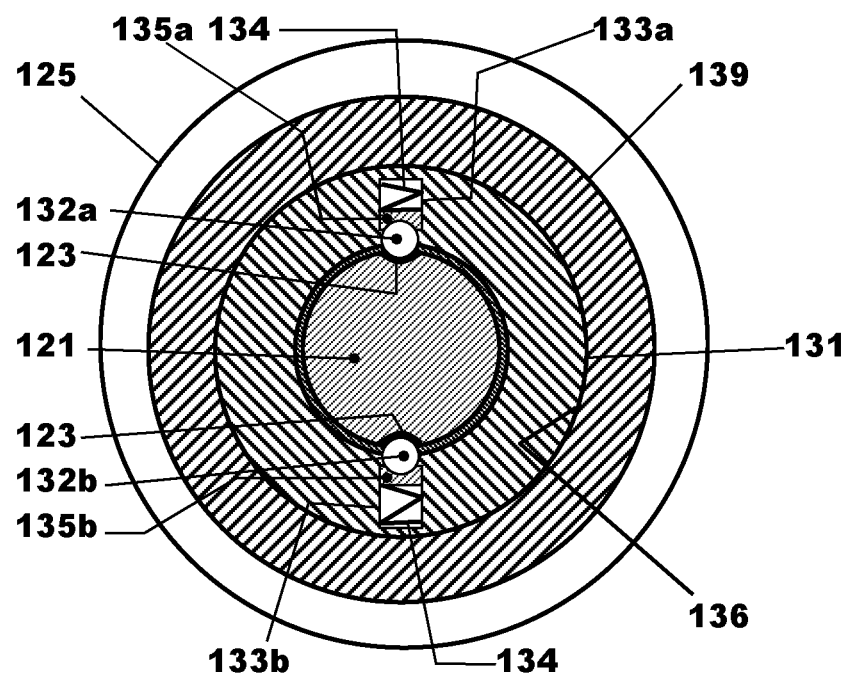
FIG. 4c is a cross-sectional view on the line X-X on FIG. 4a showing two spring loaded detents each of which is engaged with a respective check hold recess.
Figure 4D:
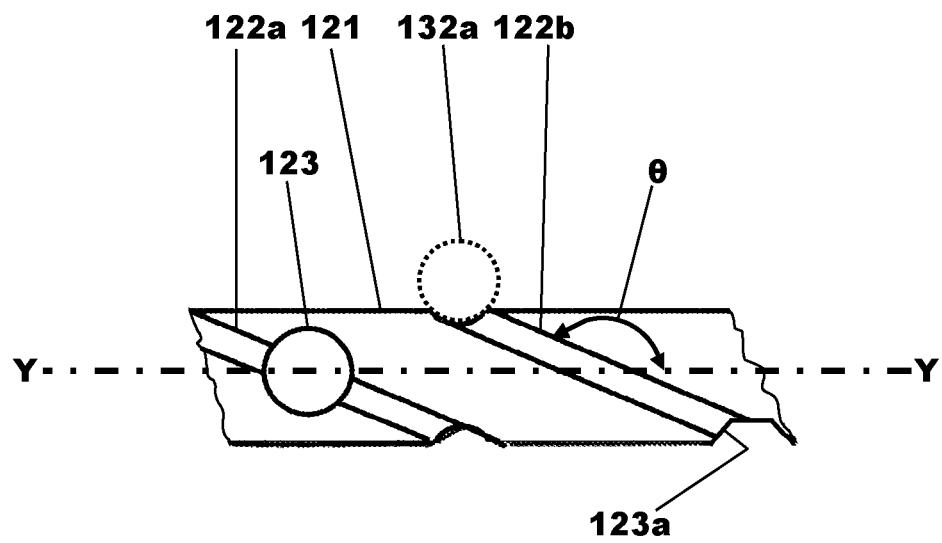

With reference to FIGS. 3 to 4d there is shown a motor vehicle 105 in accordance with this disclosure having a door 110 pivotally mounted to part of a body structure 106 of the motor vehicle 105 for movement between fully open and fully closed positions and a rotary vehicle door check mechanism 120 to prevent movement of the door 110 in an opening direction beyond a predefined limit referred to as a fully open position and to provide a number of predefined check positions.

The door 110 has a door structure defining a cavity 111 in which the rotary door check mechanism 120 is mounted to a structural part 112 of the door 110 defining a front end of the door cavity 111.

The rotary door check mechanism 120 comprises an elongate check arm in the form of a door check bar 121 having an end stop 126 at one end thereof and being adapted at an opposite end for attachment to part of the body structure 106 of the motor vehicle 105 by means of a transverse aperture 124 formed in the door check bar 121 for accommodating a mounting pin 109. The mounting pin 109 is engaged with a bracket 108 fastened to part of the body structure 106 of the motor vehicle 105. The mounting pin 109 permits the door check bar 121 to pivot about a substantially vertical axis V-V but prevents rotation of the door check bar 121 about a longitudinal axis Y-Y of the door check bar 121.

A resilient pad 127 is located adjacent the end stop 126 to provide a shock absorbing buffer when the door 110 reaches the fully open position.

The rotary door check mechanism 120 further comprises a support housing 125 fastened to the structural part 112 of the door 110 within the door cavity 111. The support housing 125 has an aperture defining a passage through which the door check bar 121 extends.

The door check bar 121 is circular in cross-section and has two helical guides in the form of first and second helical grooves 122a and 122b are formed therein. At various positions along each helical groove 122a and 122b, check hold recesses 123 are formed for cooperation with respective spring loaded detents 132a, 132b forming part of a door holding mechanism 130 disposed in the support housing 125 so as to provide predefined door check holding positions for the door 110 between fully open and fully closed positions. In the case of the example shown in FIG. 4a the two spring loaded detents 132a, 132b are engaged with check stops in the form of check hold recesses 123 corresponding to a door fully open position and one further check hold recess 123 corresponding to a door half open position is shown.

The door holding mechanism 130 comprises a rotary body member 131 supporting the two sprung loaded detents 132a, 132b. The detent 132a is engaged with the helical groove 122a and the detent 132b is engaged with the helical groove 122b.

The body member 131 is rotatably supported in a bore 136 formed in a nose portion 139 of the support housing 125. An end plate 128 is fastened to a free end of the nose portion 139 to retain the body member 131 in the bore 136 of the support housing 125. In the case of this example the body member 131 forms in combination with the bore 136 a plain bearing that rotatably supports the body member 131 in the support housing 125, however it will be appreciated that alternative bearing configurations could be used to rotatably support the body member 131 in the support housing 125.

The body member 131 defines two recesses 133a, 133b each accommodating a respective one of the spring loaded detents 132a, 132b. Each of the spring loaded detents 132a, 132b is mounted on a respective carrier 135a, 135b that is slideably mounted in the respective recess 133a, 133b.

In the case of this example each of the spring loaded detents 132a, 132b is in the form of a spherical ball but this need not be the case and an alternative shape could be used for the spring loaded detents 132a, 132b. The spring loaded detents 132a, 132b are circumferentially spaced with respect to one another by 180 degrees in this example.

In each case a biasing member such as a helical spring 134 is used to bias a respective detent 132a, 132b into engagement with the helical groove 122a, 122b with which it cooperates.

A number of check hold recesses 123 are formed in each of the helical groove 122a, 122b in predefined positions along the length of the respective helical groove 122a, 122b. Each check hold recess 123 is wider and deeper than the respective helical groove 122a, 122b thereby allowing the detents 132a, 132b to engage more fully therewith and requiring more force to be applied by the door 110 to the support housing 125 to axially displace the support housing 125 with respect to the check bar 121 than is required when there is no engagement of the detents 132a, 132b with the check hold recesses 123. Although the check hold recesses 123 shown in FIGS. 4a, 4b and 4c are substantially part spherical in shape it will be appreciated that other shapes could be used.

With particular reference to FIG. 4b the first helical groove 122a has three check hold recesses 123 formed therein and the second helical groove 122b has two check hold recesses formed therein. It will be appreciated that the number and positioning of the check hold recesses 123 shown in FIG. 4b is exemplary in nature and that there may be greater or fewer check hold recesses than those shown.

In FIG. 4a the left hand ends of the helical grooves 122a, 122b are the door open ends of the helical grooves 122a, 122b and the right hand ends of the helical grooves 122a, 122b are the door shut ends of the helical grooves 122a, 122b.

The position a-a shown in FIG. 4b corresponds to a door fully open position as shown in FIG. 4a and in this position both of the helical grooves 122a, 122b has a check hold recess 123 formed therein to provide the maximum resistance to door motion.

The position b-b shown in FIG. 4b corresponds to a door half open position and in this position both of the helical grooves 122a, 122b has a check hold recess 123 formed therein to provide the maximum resistance to door motion.

The position c-c shown in FIG. 4b corresponds to a door partially open intermediate position and in this position between half open and shut only the first helical groove 122a has a check hold recess 123 formed therein to provide a lower resistance to door motion. In this case the resistance to motion is substantially equal to half of the maximum resistance to door motion that can be provided.

This intermediate position is useful for example in a parking garage when only limited door opening is possible due to the presence of an adjacent motor vehicle.

It will be appreciated that because there are two helical grooves 122a, 122b more door check holding positions can be provided than those shown in FIG. 4b without the check hold recesses 123 in either of the helical grooves 122a, 122b overlapping one another.

With particular reference to FIG. 4d it can be seen that the helical grooves 122a, 122b are arranged at a helix angle θ with respect to the longitudinal axis Y-Y of the check bar 121. In the case of this example the helical grooves 122a, 122b are arranged in a similar manner to a dual start screw thread with a 180 degree phase difference but it will be appreciated that in other embodiments a different arrangement could be used. For example, an alternative groove shape is shown in FIG. 4d to illustrate that this disclosure is not limited to a semicircular groove shape and an alternative check hold recess shape 123a is shown to illustrate that this disclosure is not limited to a part-spherical check hold recess shape.

It will be appreciated that varying the helix angle θ will affect the force required to displace the support housing 125 relative to the check bar 121. As the helix angle θ is increased the force required to move the support housing 125 relative to the check bar 121 will increase and so the resistance to movement of the door 110 will also increase.

Therefore, in alternative embodiment not shown, the helix angle θ at the door fully open end of the check bar 121 is larger than the helix angle θ at the door closed end of the check bar 121. This will have the effect of increasing the resistance to motion of the door 110 as it approached the fully open position. This increase in helix angle θ can be uniform along the length of the check bar 121 or can be only near to the door fully open end of the check bar 121.

In operation, movement of the door 110 will cause the support housing 125 to move relative to the check bar 121 and, due to the engagement of the detents 132a, 132b with the helical grooves 122a, 122b respectively, this will cause the body member 131 to be rotated in the bore 136.

In the case of the example shown, an opening motion of the door 110 will cause the body member 131 to rotate in a counter-clockwise direction as viewed from the end stop 126 of the check bar 121 and closing motion of the door 110 will cause the body member 131 to rotate in a clockwise direction as viewed from the end stop 126 of the check bar 121.

It will be appreciated that friction within the rotary vehicle door check mechanism 120 will resist movement of the door 110 in either direction but because, due to the helix angle θ, the detents 132a, 132b are in effect being pulled uphill when the door 110 is being opened and are being pushed downhill when the door 110 is closing the resistance to movement is greater in the opening direction that it is in the closing direction.

When the position of the check bar 121 relative to the body member 131 is such that one or more detents 132a, 132b becomes engaged with a respective check hold recess 123 then the resistance to movement of the door 110 will increase and this constitutes a door check position, that is to say, a door open position in which the door 110 is temporarily held in position by the rotary door check mechanism 120 and requires additional force to be applied to move it in either direction. The door check positions may also be referred to as specified open positions or partially open positions.

It will be appreciated that the length available for positioning of a check hold recess is greater than with a linear arrangement because not only are there two helical grooves in which to provide check hold recesses but each of the grooves extends around an outer surface of the door check bar and so is longer than a linear groove would be.

With reference to FIG. 5 to FIG. 9 there is shown a second embodiment of a rotary door check mechanism 220 that is intended to be a direct replacement for the rotary door check mechanism previously described with respect to FIGS. 3 to 4d and which, in many respects, is the same as the rotary door check mechanism 120 previously described.

The rotary door check mechanism 220 comprises an elongate check arm in the form of a door check bar 221 having an end stop at one end and being adapted at an opposite end for attachment to part of a body structure of a motor vehicle such as the body structure 106 of the motor vehicle 105 shown in FIG. 3 by means of a transverse aperture (not shown) formed in the door check bar 221 for accommodating a mounting pin as previously described.

As before the mounting pin is engaged with a bracket fastened to part of the body structure of the motor vehicle so as to permit the door check bar 221 to pivot about the mounting pin but prevent rotation of the door check bar 221 about a longitudinal axis of the door check bar 221. As before, a resilient pad can be located adjacent the end stop to provide a shock absorbing buffer when a door such as the door 110 shown in FIG. 3 reaches a fully open position.

As before, the rotary door check mechanism 220 further comprises a support housing 225 fastened to a structural part of the door. The support housing 225 has an aperture through which the door check bar 221 extends.

As before, the door check bar 221 is circular in cross-section but, in the case of this second embodiment, has three helical guides in the form of first, second and third helical grooves 222a, 222b and 222c.

At various positions along each of the helical grooves 222a, 222b and 222c check stops in the form of check hold recesses 223 are formed for cooperation with respective detents 232a, 232b and 232c forming part of a door holding mechanism 230 disposed in the support housing 225 so as to provide predefined door check holding positions for a door, such as the door 110 shown in FIG. 3, between fully open and fully closed positions.

The door holding mechanism 230 comprises a rotary body member 231 supporting the spring loaded detents 232a, 232b and 232c. The detent 232a is engaged with the helical groove 222a, the detent 232b is engaged with the helical groove 222b and the detent 232c is engaged with the helical groove 222c. The spring loaded detents 232a, 232b and 232c are in the case of this example circumferentially spaced at 120 degrees with respect to one another.

The body member 231 is rotatably supported in a bore 236 formed in a nose portion 237 of the support housing 225 and an end plate (not shown) is fastened to a free end of the nose portion 237 to retain the body member 231 in the bore 236 of the support housing 225. In the case of this example, the body member 231 forms in combination with the bore 236 a plain bearing that rotatably supports the body member 231 in the support housing 225, however it will be appreciated that alternative bearing configurations could be used to rotatably support the body member 231 in the support housing 225.

The body member 231 defines three recesses 233a, 233b and 233c each accommodating a respective one of the sprung loaded detents 232a, 232b and 232c. Each of the spring loaded detents 232a, 232b and 232c is mounted on a respective carrier 235 that is slideably mounted in the respective recess 233a, 233b and 233c.

In the case of this example each of the sprung loaded detents 232a, 232b and 232c has an end in the form of a spherical ball but this need not be the case and another shape could be used for the detents. In each case a helical compression spring 234 is used to bias the respective detent 232a, 232b and 232c into engagement with helical groove 222a, 222b, 222c with which it cooperates.

At predefined positions along the length of each of the helical grooves 222a, 222b and 222c one or more check hold recesses 223 are formed in each of the helical grooves 222a, 222b and 222c. Each of the check hold recesses 223 is wider and deeper than respective helical groove 222a, 222b and 222c thereby allowing the detents 232a, 232b and 232c to engage more fully therewith and requiring more force to be applied by a connected door to move the support housing 225 mounted on the door relative to the door check bar 221 than is required when there is no engagement of the detents 232a, 232b and 232c with the check hold recesses 223.

Figure 5:
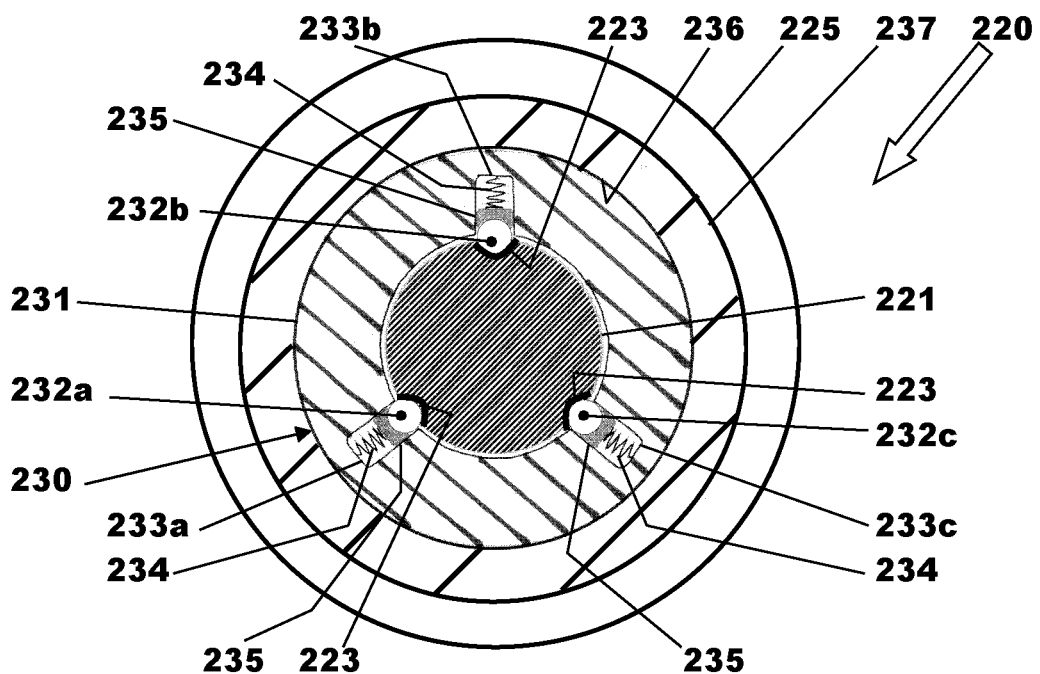
FIG. 5 is a cross-sectional view similar to FIG. 4c but showing a second embodiment of a rotary door check mechanism having three sprung loaded detents each of which is engaged with a respective check hold recess in a check arm having three helical grooves.

In FIG. 5 the door check bar 221 is shown in a door fully open position in which all three of the detents 232a, 232b and 232c are engaged with a respective check hold recess 223. Although the check hold recesses shown in FIG. 5 are part spherical in shape it will be appreciated that other shapes could be used.

Figure 6:
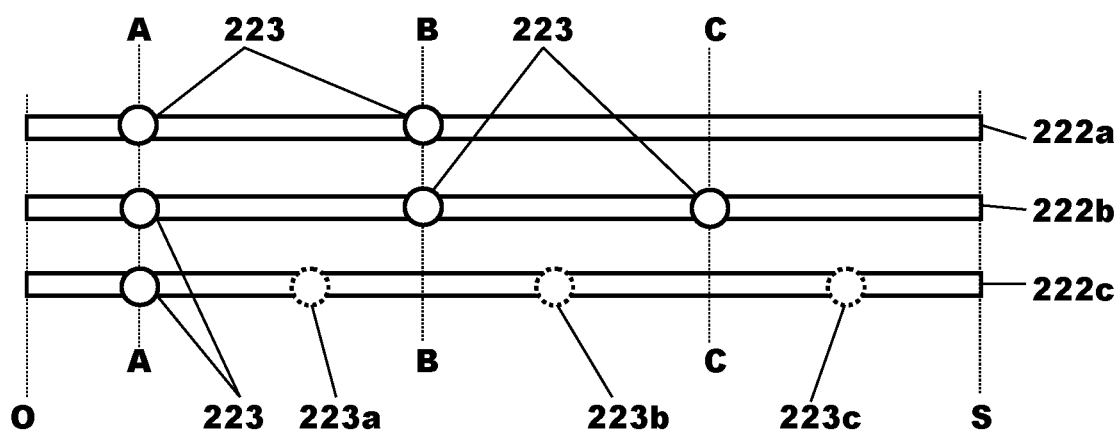
FIG. 6 is a diagram showing the three helical grooves formed in the check arm of FIG. 5 laid out in a linear form and showing the positioning of the check hold recesses formed in each of the helical grooves.

With particular reference to FIG. 6 which shows the three helical grooves 222a, 222b and 222c laid out in a linear fashion, the first helical groove 222a has two check hold recesses 223 formed therein, the second helical groove 222b has three check hold recesses 223 formed therein and the third helical groove 222c has a single check hold recess 223 formed therein. It will be appreciated that the number and positioning of the check hold recesses 223 shown in FIG. 6 is exemplary in nature and that there will often be more check hold recesses than those shown, for example there could be additional check hold recesses 223a, 223b and 223c as shown in dotted outline on FIG. 6.

In FIG. 6 the line "O" indicates the door open end of the helical grooves 222a, 222b, 222c and the line "S" indicates the door shut end of the helical grooves 222a, 222b, 222c.

The position A-A shown in FIG. 6 corresponds to a door fully open position and in this position all three of the helical grooves 222a, 222b and 222c has a check hold recess 223 formed therein to provide the maximum resistance to door motion.

The position B-B shown in FIG. 6 corresponds to a door half open position and in this position the first and second helical grooves 222a and 222b each has a check hold recess 223 formed therein to provide a high level of resistance to door motion which in this case is substantially equal to two thirds of the maximum resistance to door motion that can be provided.

The position C-C shown in FIG. 6 corresponds to a door open position that is less open than half open and in this intermediate position only the helical groove 222b has a check hold recess 223 formed therein to provide resistance to door motion. This intermediate position is useful for example in a parking garage when only limited door opening is possible due to the presence of an adjacent motor vehicle. In this case the resistance to door movement is substantially equal to one third of the maximum resistance to door motion that can be provided.

It will be appreciated that because there are multiple helical grooves 222a, 222b, 222c many more door check holding position could be provided than those shown in FIG. 6 without the check hold recesses 223 in any one of the helical grooves 222a, 222b, 222c overlapping one another. In addition, the amount of resistance provided to door movement when in a check hold position can be varied by a factor of three in the case of this example by changing the number of check hold recesses engaged at each position. It will further be appreciated that even more variability could be provided by changing the characteristics of the check hold recesses with some providing more resistance to movement than others.

Figure 7:
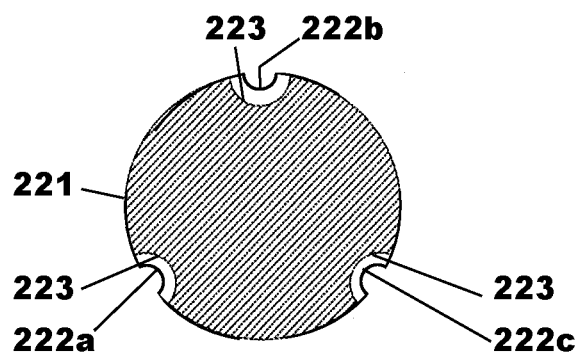
FIG. 7 is a cross-sectional view at the position A-A shown in FIG. 6 through the check arm.
Figure 8:
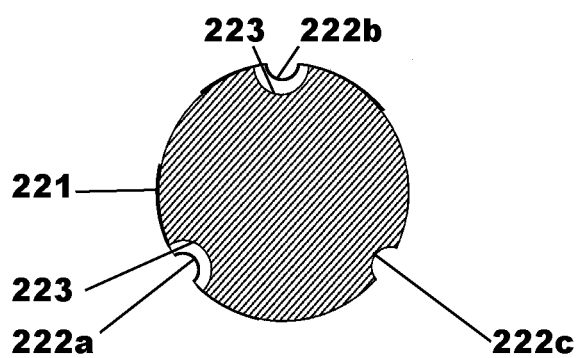
FIG. 8 is a cross-sectional view at the position B-B shown in FIG. 6 through the check arm.
Figure 9:
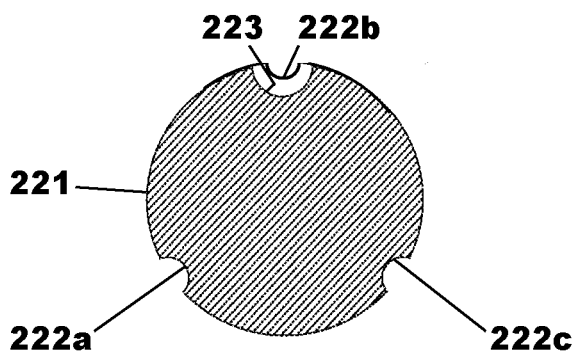
FIG. 9 is a cross-sectional view at the position C-C shown in FIG. 6 through the check arm.

FIG. 7 shows a cross-section through the door check bar 221 at the position A-A in FIG. 6, FIG. 8 shows a cross-section through the door check bar 221 at the position B-B in FIG. 6 and FIG. 9 shows a cross-section through the door check bar 221 at the position C-C in FIG. 6.

As before it will be appreciated that varying the helix angle of the helical grooves 222a, 222b and 222c will affect the force required to displace the support housing 225 relative to the door check bar 221. If the helix angle is increased the force required to move the support housing 225 relative to the door check bar 221 will increase and so the resistance to movement of a connected door will also increase.

In operation movement of a door connected to the rotary vehicle door check mechanism 220 will cause movement of the support housing 225 relative to the door check bar 221 and due to the engagement of the detents 232a, 232b and 232c with the helical grooves 222a, 222b and 222c respectively this will cause the body member 231 to be rotated in the bore 236. This direction of rotation of the body member 231 will depend upon the direction of motion of the door and the orientation of the helical grooves. That is to say, whether the helical grooves 222a, 222b and 222c are orientated similar to a left hand screw thread or are orientated similar a right hand screw thread.

It will be appreciated that friction with the rotary vehicle door check mechanism 220 will resist movement of a connected door in either direction thereby damping motion of the door. Furthermore, when the position of the door check bar 221 relative to the body member 231 is such that one or more detents 232a, 232b and 232c becomes engaged with a respective check hold recess 223 then the resistance to movement of the door will increase and the position of the door check bar 221 and the door constitutes a door check position.

It will be appreciated that the length available for positioning of a check hold recess is greater than with a linear arrangement because not only are there three helical grooves in which to provide check hold recesses but each of the grooves extends around an outer surface of the door check bar and so is longer than a linear groove would be.

Although this disclosure has been described with respect to preferred embodiments in which helical guides are formed by grooves in the check bar it will be appreciated that it would be possible to use helical ribs on the check bar instead of grooves and use a concave detent to engage with each of the helical ribs.

Although in the case of the described embodiments the check bar is attached to the structure of the motor vehicle and the body member is rotatably supported on the door it will be appreciated that the opposite arrangement could be used with the body member being rotatably supported by the structure of the motor vehicle and the check bar being attached to the door.

Therefore in summary, a motor vehicle having a rotary door check mechanism is disclosed in which an elongate arm having helical guides is attached to one of a door and a door frame for meshing engagement with a rotary member supported on the other of the door and the door frame. Movement of the door causes the rotary member to be rotated thereby bring detents on the rotary member into contact with features of the helical guides that increase the resistance of movement of the door thereby constituting door check positions.

It will be appreciated that friction within the mechanism between the rotary member and the support housing and between the detents and the helical guides helps to dampen out rapid door movements.

It will be appreciated that the helical nature of the guides provides more opportunities for door check positions along the door check bar.

It will be appreciated that by having two or more helical guides results in increased possibilities to provide different resistance to door motion at different check positions.

It should be understood that terms such as "about," "substantially," and "generally" are not intended to be boundaryless terms, and should be interpreted consistent with the way one skilled in the art would interpret those terms. It should also be understood that directional terms such as "forward," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various FIGS. accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a door pivotable between fully open and fully closed positions;
a door check mechanism including a bar having a helical groove and at least one check hold recess along the helical groove,
wherein the door check mechanism includes at least one detent configured to contact the helical groove,
wherein the at least one detent is biased toward the helical groove by a spring,
wherein the at least one detent is configured to be received in the at least one check hold recess,
wherein, when the at least one detent is received in the at least one check hold recess, additional force is required to pivot the door than when the detent is not received in the at least one check hold recess,
wherein the bar includes first and second helical grooves circumferentially spaced-apart from one another by about 180 degrees,
wherein the door check mechanism is configured to hold the door in the fully open position, a half open position, and an intermediate position between the half open position and the fully closed position,
wherein the first and second helical grooves each include a check hold recess configured to receive detents when the door is in the fully open position and the half open position, and
wherein only the first helical groove includes a check hold recess configured to receive a detent when the door is in the intermediate position.

2. The motor vehicle as recited in claim 1, wherein the door check mechanism includes a rotary holding member supporting the spring and the at least one detent.

3. The motor vehicle as recited in claim 2, wherein:
the door check mechanism includes a support housing with a bore within which the rotary holding member is received, and
the rotary holding member is configured to rotate within the bore.

4. The motor vehicle as recited in claim 1, wherein the helical groove extends around the bar at a constant angle.

5. The motor vehicle as recited in claim 1, wherein the helical groove extends around the bar at an angle which varies along the length of the bar.

6. The motor vehicle as recited in claim 5, wherein the helical groove extends around the bar at a helix angle which increases along the length of the bar such that the door check mechanism increasingly resists movement of the door to the fully open position.

7. A motor vehicle, comprising:
a door pivotable between fully open and fully closed positions;
a door check mechanism including a bar having a helical groove and at least one check hold recess along the helical groove,
wherein the door check mechanism includes at least one detent configured to contact the helical groove,
wherein the at least one detent is biased toward the helical groove by a spring,
wherein the at least one detent is configured to be received in the at least one check hold recess,
wherein, when the at least one detent is received in the at least one check hold recess, additional force is required to pivot the door than when the at least one detent is not received in the at least one check hold recess,
wherein the bar includes first, second, and third helical grooves circumferentially spaced-apart from one another by about 120 degrees,
wherein the door check mechanism is configured to hold the door in the fully open position, a half open position, and an intermediate position between the half open position and the fully closed position,
wherein the first, second, and third helical grooves each include a check hold recess configured to receive detents when the door is in the fully open position,
wherein only the first and second helical grooves include a check hold recess configured to receive detents when the door is in the half open position, and
wherein only the first helical groove includes a check hold recess configured to receive a detent when the door is in the intermediate position.

8. A door check mechanism, comprising:
a bar including a helical groove and at least one check hold recess along the helical groove, and wherein the helical groove extends around the bar at a helix angle which increases along the length of the bar such that the door check mechanism increasingly resists movement of a door to a fully open position.

9. The door check mechanism as recited in claim 8, including at least one detent configured to be biased into contact with the helical groove by a spring.

10. The door check mechanism as recited in claim 9, wherein:
the door check mechanism includes a rotary holding member supporting the spring and the at least one detent,
the door check mechanism includes a support housing with a bore within which the rotary holding member is received, and
the rotary holding member is configured to rotate within the bore.

11. The door check mechanism as recited in claim 10, wherein:
the at least one detent is configured to be received in the at least one check hold recess, and
when the at least one detent is received in the at least one check hold recess, additional force is required to pivot a door than when the at least one detent is not received in the at least one check hold recess.

12. The door check mechanism as recited in claim 8, wherein the helical groove is helical along its entire length.

13. The door check mechanism as recited in claim 8, wherein the helix angle gradually and continuously increases along the length of the bar.

* * * * *